US012632246B2

(12) United States Patent
Chibon et al.

(10) Patent No.: US 12,632,246 B2
(45) Date of Patent: May 19, 2026

(54) DEPLOYING PATCHES VIA RPMS

(71) Applicant: Red Hat, Inc., Raleigh, NC (US)

(72) Inventors: Pierre-Yves Chibon, Puteaux (FR); Leigh Griffin, Waterford (IE)

(73) Assignee: Red Hat, Inc., Raleigh, NC (US)

( * ) Notice: Subject to any disclaimer, the term of this patent is extended or adjusted under 35 U.S.C. 154(b) by 57 days.

(21) Appl. No.: 17/941,889

(22) Filed: Sep. 9, 2022

(65) Prior Publication Data

US 2024/0086181 A1      Mar. 14, 2024

(51) Int. Cl.
| | | |
|---|---|---|
| *G06F 9/445* | (2018.01) | |
| *G06F 8/61* | (2018.01) | |
| *G06F 8/658* | (2018.01) | |

(52) U.S. Cl.
CPC ................ *G06F 8/658* (2018.02); *G06F 8/61* (2013.01)

(58) Field of Classification Search
CPC ... G06F 8/658; G06F 8/61; G06F 8/71; G06F 8/60; G06F 8/06
USPC ................................................ 717/168–178
See application file for complete search history.

(56) References Cited

U.S. PATENT DOCUMENTS

| | | | |
|---|---|---|---|
| 6,954,928 B2 | 10/2005 | Allsop et al. | |
| 8,255,362 B2 | 8/2012 | Johnson et al. | |
| 8,370,829 B2 | 2/2013 | Ferris et al. | |
| 8,468,516 B1 * | 6/2013 | Chen ....................... | G06F 8/656 |
| | | | 717/169 |
| 8,612,966 B2 | 12/2013 | Huff et al. | |
| 8,806,471 B2 | 8/2014 | Vidal et al. | |
| 9,563,417 B2 | 2/2017 | Jha et al. | |
| 2002/0188665 A1 * | 12/2002 | Lash ................... | H04L 63/0281 |
| | | | 707/E17.12 |
| 2017/0034023 A1 * | 2/2017 | Nickolov ............ | H04L 43/0817 |
| 2019/0369979 A1 * | 12/2019 | Woods ................. | G06F 16/137 |
| 2019/0391800 A1 * | 12/2019 | Lin ........................... | G06F 8/65 |
| 2022/0164452 A1 * | 5/2022 | Landman ............ | G06F 16/9027 |

FOREIGN PATENT DOCUMENTS

| | | |
|---|---|---|
| CN | 1965295 A | 5/2007 |

* cited by examiner

*Primary Examiner* — Chuck O Kendall
(74) *Attorney, Agent, or Firm* — Kilpatrick Townsend & Stockton LLP

(57) ABSTRACT

Systems and methods for automated targeted patching of a target system. In one embodiment the present disclosure includes a method for compiling binary files from a source code package; running a diff tool to determine differences between the binary files and an application already installed on a target system; generating, based on the determined differences, a patch that includes at least one file to be installed on the target system; generating, a mapping file, the mapping file including information on where the at least one file will be installed on the target system; combining, the mapping file and the patch into a patch package; and installing the patch package on the target system.

20 Claims, 5 Drawing Sheets

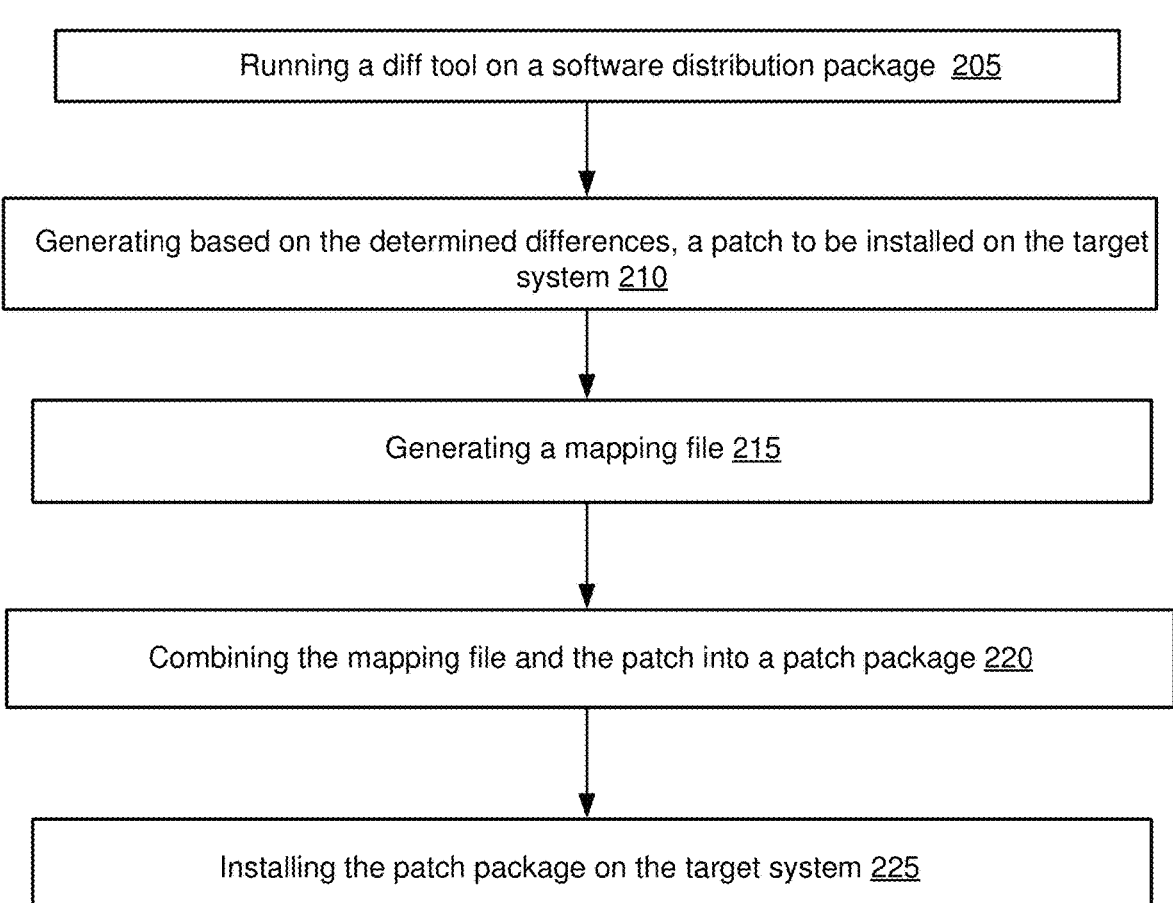
FIG. 2

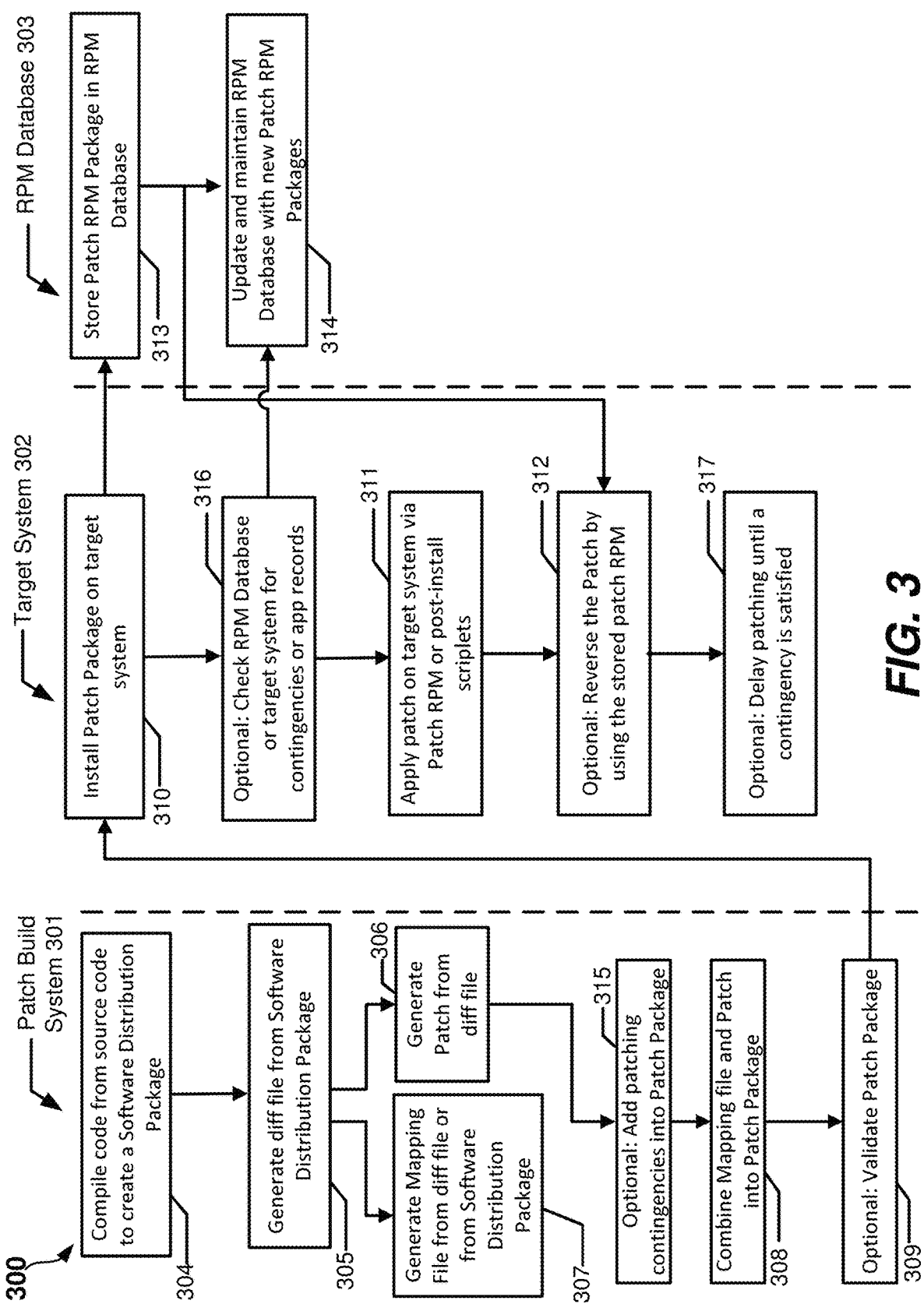

RPM Database 303

Store Patch RPM Package in RPM Database — 313

Update and maintain RPM Database with new Patch RPM Packages — 314

Target System 302

Install Patch Package on target system — 310

Optional: Check RPM Database or target system for contingencies or app records — 316

Apply patch on target system via Patch RPM or post-install scriptlets — 311

Optional: Reverse the Patch by using the stored patch RPM — 312

Optional: Delay patching until a contingency is satisfied — 317

Patch Build System 301

Compile code from source code to create a Software Distribution Package — 304

Generate diff file from Software Distribution Package — 305

Generate Patch from diff file — 306

Generate Mapping File from diff file or from Software Distribution Package — 307

Optional: Add patching contingencies into Patch Package — 315

Combine Mapping file and Patch into Patch Package — 308

Optional: Validate Patch Package — 309

DEPLOYING PATCHES VIA RPMS

FIELD

The present technology pertains to systems and methods for targeted deployment of patches onto target systems. In particular, but not by way of limitation, the present technology provides systems and methods for deploying patches via RPM Packages ("RPMs").

BACKGROUND

The RPM packaging format allows to easily deliver binary files onto a RPM-based Linux system. This format can be used to deliver, install, track binary files and run scriptlets allowing some customization of the system before or after installing the files. However, distribution of applications via RPMs is limited to distribution of full applications, or full applications with changes inserted into them, and are not utilized to distribute customization of binary files.

SUMMARY

In various embodiments the present technology is directed to an automated computer implemented method comprising a computer implemented method for targeted patching comprising: compiling binary files from a source code package; running a diff tool to determine differences between the binary files and an application already installed on a target system; generating, based on the determined differences, a patch that includes at least one file to be installed on the target system; generating, a mapping file, the mapping file including information on where the at least one file will be installed on the target system; combining, the mapping file and the patch into a patch package; and installing the patch package on the target system.

BRIEF DESCRIPTION OF THE DRAWINGS

In the description, for purposes of explanation and not limitation, specific details are set forth, such as particular embodiments, procedures, techniques, etc. to provide a thorough understanding of the present technology. However, it will be apparent to one skilled in the art that the present technology may be practiced in other embodiments that depart from these specific details.

The accompanying drawings, where like reference numerals refer to identical or functionally similar elements throughout the separate views, together with the detailed description below, are incorporated in and form part of the specification, and serve to further illustrate embodiments of concepts that include the claimed disclosure and explain various principles and advantages of those embodiments.

Figure 1:
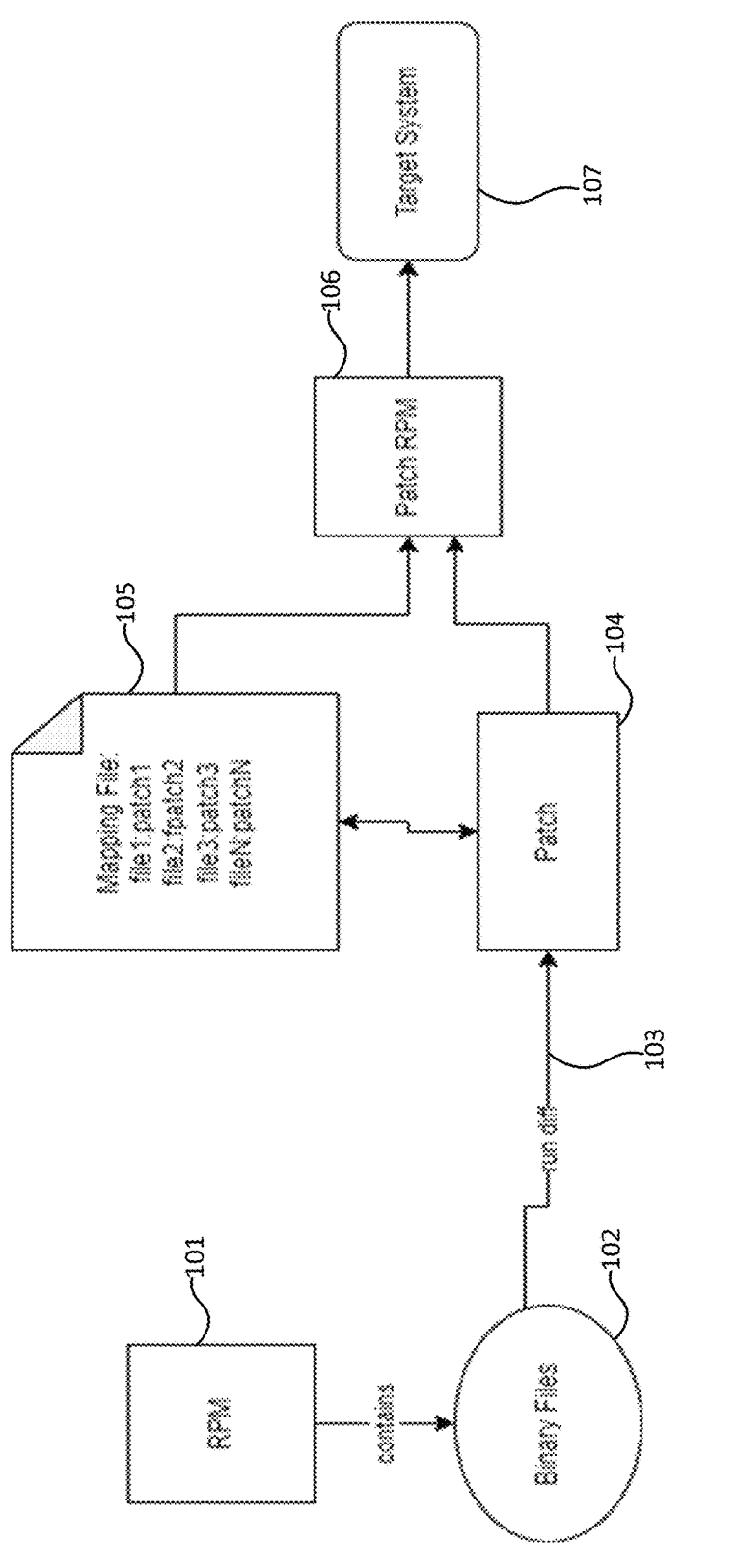

The methods and systems disclosed herein have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

FIG. 1 illustrates one embodiment of the proposed methods and system components to deploy patches onto a target system, according to several aspects of the present disclosure.

FIG. 2 illustrates a flow diagram describing a method to deploy targeted patches onto a system, according to several aspects of the present disclosure.

FIG. 3 presents a diagram illustrating the relationship between the various parts of the system according to several aspects of the present disclosure.

Figure 4:
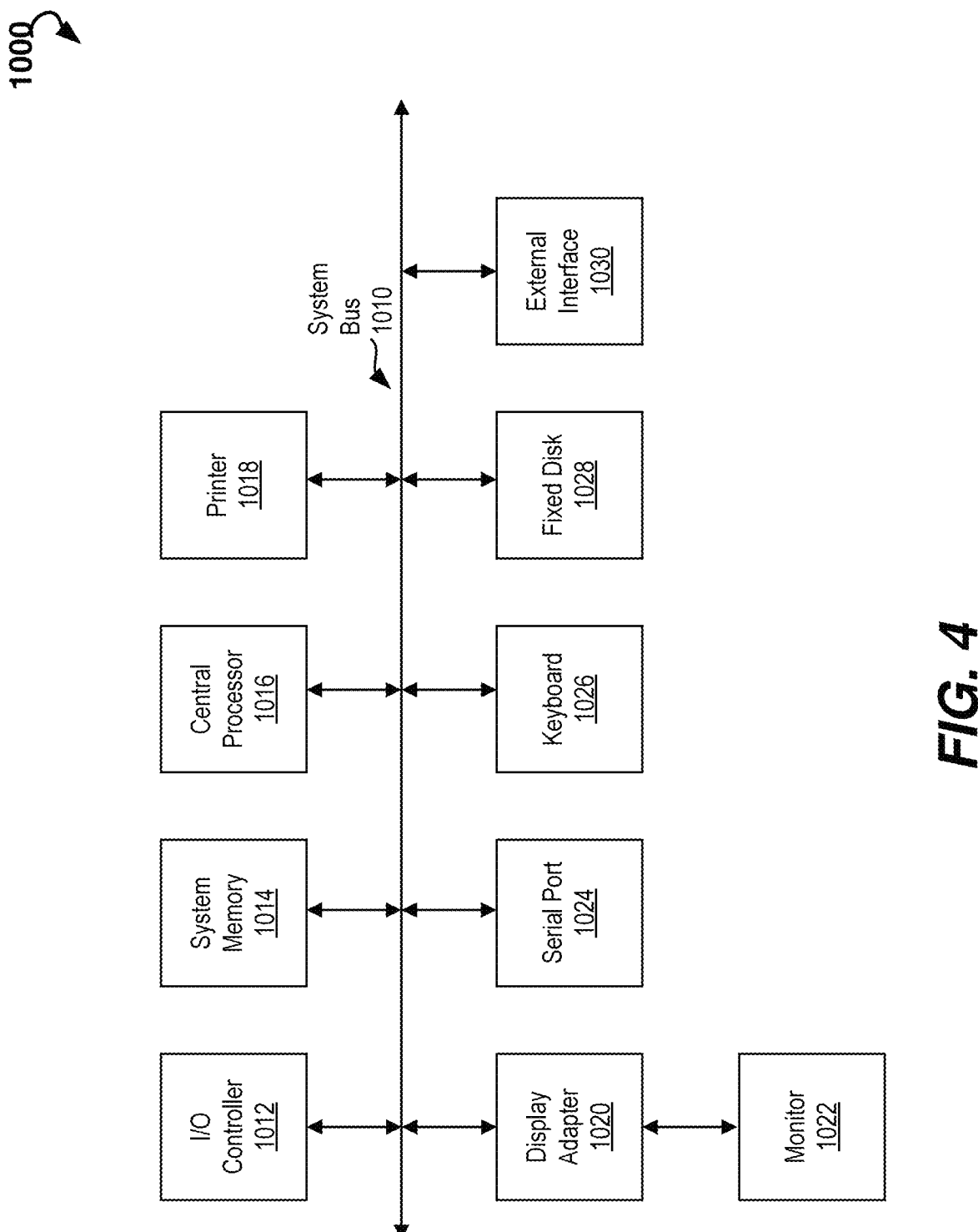

FIG. 4 presents a block diagram of a computer apparatus, according to at least aspect of the present disclosure.

Figure 5:
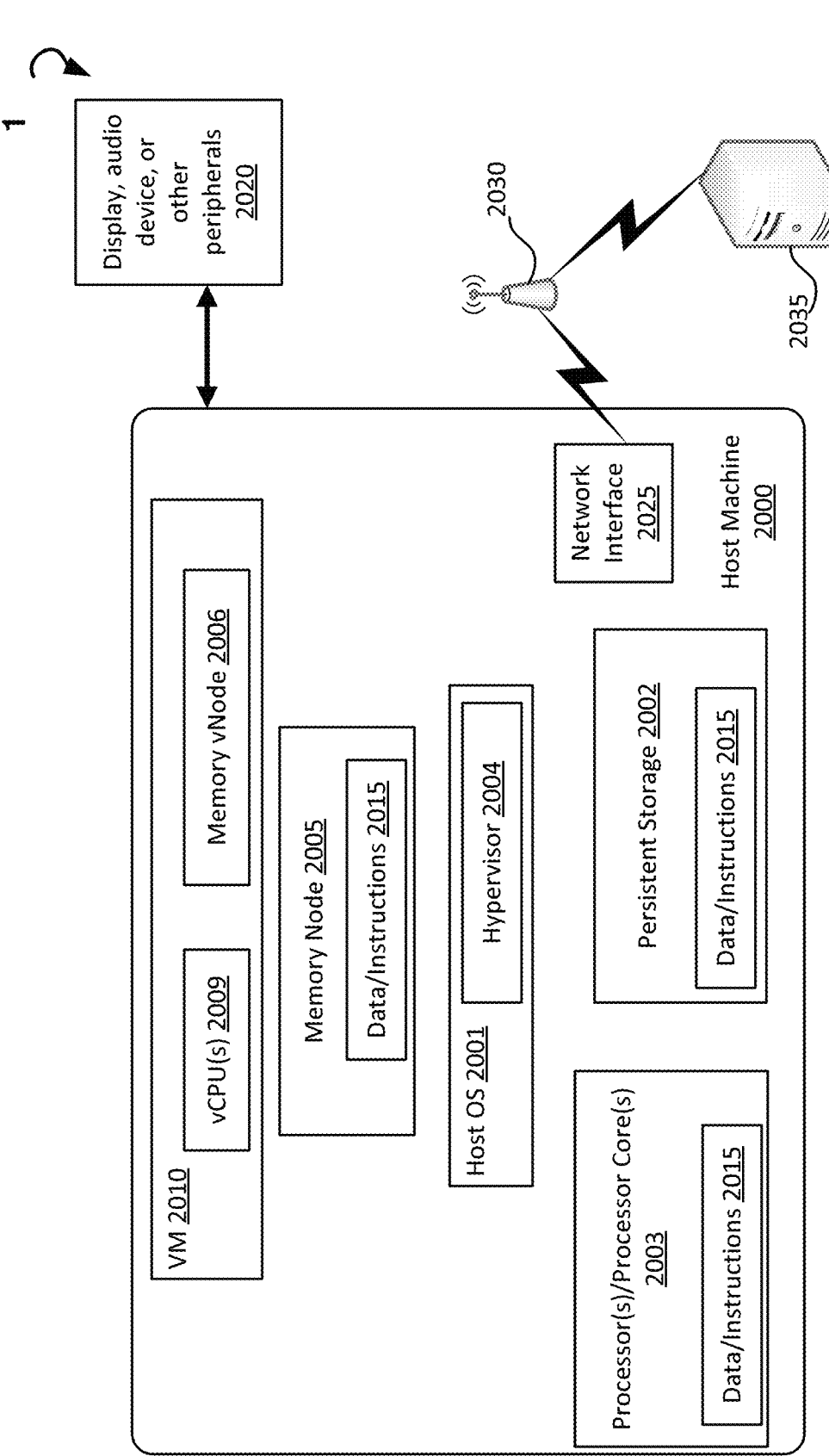

FIG. 5 is a diagrammatic representation of an example system that includes a host machine within which a set of instructions to perform any one or more of the methodologies discussed herein may be executed, according to at least aspect of the present disclosure.

DETAILED DESCRIPTION

Linux systems commonly rely on RPM packages and the RPM package manager to build, install, query, verify, and deploy software. An RPM package is a bundle of different files that can contain binary files (that may executable files, or can be non-executable binary files such as libraries that are binary files exposing an API or ABI), configuration files, as well as documentation and text files. Currently, when patching already existing or installed applications, a Linux system deploying RPMs installs a new RPM package containing a full pre-built application with necessary version updates and changes, and installs this RPM package to override previous old versions of the application. A new RPM package with the full application is installed to override older versions irrespective of how small or minor the changes or updates to the application are, even if only a small number of files in the application are altered, the full RPM replacement must be installed and applied to a target system whenever a system attempts to update or patch systems whether locally on a server wide basis. Having to install full RPM packages with every patch or update makes updates and patches very resource intensive, especially when system-wide deployment is necessary, requiring the creation, delivery, and deployment of large packages of software. This is especially problematic in an edge computing environment of low-power, low computation/low-processing, and low storage capabilities, usually run on distributed cloud-based servers and systems.

Delta RPM are an available alternate version of an RPM that allow rebuilding a newer version of a package based on the previous version and a binary diff (also referred to herein as a "binary diff file"), however, Delta RPMs also require rebuilding the entire RPM with the full application package to install updates and patches. Delta-RPM is utilized to rebuild an RPM locally after downloading just a diff (also referred to herein as a "diff file"). However, it is not a mechanism by which distribution, deployment and tracking of patches installed on a system-wide basis may occur.

Non-RPM based patching deployment solutions like Ansible allow updates that target portions of an application and achieve some improvements over replacing the full RPM of an application, but fail to provide tracking and record keeping or log changes to allow the application or file history to be accessed. Ansible does not include any traceability or record of alterations to the application or to the system, making it very difficult to trace or track changes, for example with changes on binary and non-human readable files when changes are very difficult to ascertain. Furthermore, Ansible relies on a manual process to apply patches to an application or the underlying system and achieve patching of programs.

Presented herein is an RPM-based solution to providing lightweight patches and updates without having to completely replace older versions of already installed applications. The presented solutions provides Linux based systems the ability to deploy frequent small sized updates or patches ensuring that the state of applications running on target systems are current and maintained to a desired state. By generating a diff of the files to be patched, for example a binary diff, and installing the diff on the target system using an altered RPM or RPM package mechanism along with mapping of the installation, an application may be updated or patched without having to completely replace or overwrite it with a full RPM package containing the full application. The systems and methods presented herein therefore enable targeted patching of applications and target systems by modifying RPMs to create a new type of RPM: a patch RPM which once installed applies the patches to the desired location on the target system file system. Other aspects may include post-install solutions that apply the patch to the target system or application on the target system that are triggered by scriptlets after installing a patch on the system. Unlike Delta RPMs, the approach presented in this disclosure modifies the file on disk, for example a binary file, without rebuilding the entire RPM, the presented approach also appears on the RPM database as a separate RPM or patch RPM with accompanying data to ensure traceability of each modification to the original application.

While the present technology is susceptible of embodiment in many different forms, there is shown in the drawings and will herein be described in detail several specific embodiments with the understanding that the present disclosure is to be considered as an exemplification of the principles of the present technology and is not intended to limit the technology to the embodiments illustrated.

FIG. 1 presents one aspect of the presented methods and systems to deploy patches or other software updates onto a target system, according to several aspects of the present disclosure. The method 100 includes several components of the system to deploy patches via RPMs, the first is code that is encapsulated into a software distribution package such as an RPM or RPM package 101 (also referred to herein as "package"). RPM 101 may be compiled code that includes files 102, or an archive that contains the files as well as any related sets of scripts or scriptlets as well as metadata for these files. In various aspects, the software distribution package or RPM package 101 may include files 102 that encompass binary files, configuration files, documentation files, source code, and metadata. For example, the files 102 may be binary files compiled from source code, text-based files, or in some aspects machine or byte code files. In several aspects, the metadata associated with the files 102 may describe various aspects of the files 102, the RPM 101 or the target system 107, including and not limited to names, for example names or titles of RPM 102, the name of the patch file 104, name of the target system, name of the package to be installed, versions and version numbers, for example version of the package or patch to be installed, the change log of the package, developer comments, human readable descriptions, a summary of the files or changes within the files, notes on contingencies, requirements for the files to be installed, the type of target system the files are to be installed on, other relevant programs or software, locations or destinations of the files for installation, storage or other actions, information on users, groups, or systems, permission information on permissions (for example, access, read, write, etc.), requirements of installing the patch or files, interfaces between software and hardware requirements, dependencies on applications or libraries, and the like. The metadata included in the RPM 101 will therefore include all the dependencies and requirements for the application, files, or patch to be installed.

A diff or diff tool is run 103 or executed to ascertain differences between the binary files in the RPM 101 and the application and to produce a patch or patch file 104 that contains the files to be installed on the target application, it may do this by creating a diff file. From the metadata in the binary files, or from the diff file, or a combination, one or more mapping files 105 may be created that maps each patch file 104 and its installation location in the target system storage drive, cloud, host machine, virtual machine, or logic drive location. The patch file 104 and the mapping file 105 are combined into a patch package, also referred to herein as a patch RPM file 106 that is deployed, installed, and applied onto a target system 107. Target system 107 may be an individual computing device with components as those of computing device 1000, FIG. 4, or host machine 2000, FIG. 5, or a collection of devices, or a complete system such as system 1, FIG. 5.

FIG. 2 illustrates a flow diagram describing a method to deploy targeted patches onto a system, according to several aspects of the present disclosure. Method 200 begins by running 205 a diff tool on a software distribution package, for example on RPM 101, FIG. 1. Running 205 the diff tool may generate a binary diff of the files to be patched on the system. The diff file that is created allows the generating 210 of a patch based on the differences between the software distribution package and any files contained within it and the already installed application to be patched. The patch includes at least one file that will be applied to the application. After a patch is generated 210, a mapping file is generated 215, in many aspects, based on the metadata in the software distribution package, the diff file, or a combination thereof. The mapping file contains information and mapping of each patch or each component or file making up a patch to a specific location in the target system, so that the installation of the patch is undertaken according to the mapping in the mapping file. Once the mapping file is generated 215, it is combined 220 with the patch file into a patch package. The patch package is then installed 220 onto the system, whereupon it may be applied onto the system based on the mapping set out in the mapping file together with the patch, to map which patch file concerns which file on the system that the patch will apply against.

FIG. 3 presents a diagram illustrating the relationship between the various parts of the system 300 according to several aspects of the present disclosure. The system 300 may include a patch build system 301 to plan, write, develop, and build a patch, a target system 302 for deployment and installation of a patch, and an RPM database 303 that is used to store installed RPM packages, maintain, trace, and update patches and RPM packages that are installed on target system 302. In one aspect, the patch build system 301 can compile source code to create a software distribution package or an RPM/RPM package such as RPM 101, FIG. 1. This RPM package as described above may contain various types of data, including binary files, configuration files, documentation files, source code, and metadata. A diff file is generated from the RPM, the diff file may be generated via a command or a diff tool installed on patch build system 301. The diff file may be a binary diff of the files that are to be patched on the target system and/or the target applications on the target system. If the diff is applied to a binary file of the RPM, binary diff tools are used to generate binary diffs. If it's a text or human-readable language file, a text-based diff or diff tool is applied. Whereupon from the diff file, a patch may be generated 306, in addition to the patch, a mapping file may be also be generated either from the diff file or from the RPM package/software distribution package and/or the myriad of files it contains or a combination thereof. In various aspects, the mapping file is created using a combination of metadata in the RPM package and the diff file. The mapping file determines which patch file concerns which file on the target system 302 that the patch will apply against.

To install the patch and the mapping file on the target system 302 and allow an automated mapping and installation process to occur, the generated patch may be combined 308 with the mapping file into a patch RPM or patch package, which is able to apply the mapping to the patch once the patch RPM is installed on the target system 302. Current RPM technologies only allow patching of an RPM by replacing it by a full RPM with a full application, however, a patch RPM with its disclosed structure of the various patch files as well as a mapping file allow it to be deployed onto a target system without the full application being included in the patch RPM, and make changes to the application and the target system 302 as dictated by the mapping file in the patch RPM.

An optional step may comprise validating 309 the patch on the patch build system to determine whether there are any errors that need to be corrected prior to combining the file with the mapping file to generate the Patch RPM, or validating the patch RPM after it has been created. The patch RPM is then installed 310 on the target system 302. Once installed, the patch RPM automatically by using the mapping file applies 311 the patch in the Patch RPM and its associated patch files to the locations determined or set out in the mapping file. In some embodiments, where a patch RPM does not directly undertake the application of the patch, other tools that have already been installed on target system 302 designed to apply patches with the mapping file, are triggered by post-install scriptlets in the RPM package upon installation 310 of the RPM package on the target system 302, and proceed to automatically apply the patch per the mapping file. In preferred embodiments, the patch RPM itself is able to undertake this process once it is installed on the target system and applies the patches to the locations in the mapping file. In several embodiments once the patch RPM is installed 310, a script is executed from the Patch RPM that reads a configuration file (which could be the mapping file) in the patch RPM, the configuration file or mapping file then directs the script or scriptlet to apply the patch to the specified files on the configuration or mapping files on the system.

In several embodiments, the patch RPM is stored 313 in an RPM database 303 whereupon it may be maintained along with other patch RPMs or RPMs from other installs, or RPMs from applications, patches, or updates. The RPM database 303 may be continuously updated 314 with new patches to provide a record of all patches, mapping files, patch packages and their associated metadata. This record-keeping ability of RPMs and RPM databases provides traceability of patches, to a minute file-level detail. Unlike traditional RPM patches where a full RPM is installed to replace an application making it difficult to trace or account for changes, the patch RPM disclosed herein provide specific changes to files as determined by the mapping file, and because the patch RPM is stored and is accessible on RPM database 303, changes to the target system 302 as well as any application on the system that is patched are traceable to the file level and detailed by the mapping file as well as the metadata included in the patch RPM.

The RPM database 303 stores all the dependencies and versions as well as information on what is installed on target system 302. Information stored may include what patches were applied, why they were applied, where they were applied, how they were applied, and when they were applied, based on the diff file, the metadata, other components of the stored patch RPM or a combination thereof. This allows advanced patching techniques to be deployed, for example a patch may require a certain feature, file or previous version to be installed on the target system prior to the patch being installed for it to function correctly. Having the RPM patches stored in an RPM database allows processes or deployment systems to detect or determine files that have been updated based on whichever patch is present in each patch RPM. This allows even binary files and changes to binary files to be detected, stored, and traced, and provides much more advanced traceability and tracking than in current technologies. Furthermore, because each patch is traceable to the file level, patches may be removed or optionally reversed 312 individually, or specific files may be changed without having to uninstall, remove, or overwrite previous installations or versions of an application, allowing a targeted approach suited for a low processing, low power, and low-resource environment. The creation of optional patching contingencies 315 is therefore enabled, and may be automated and included in the patch RPM to be installed on target system 302 whereupon determination that a contingency is satisfied may be undertaken that may result in limiting deployment of installs, application of installs, removal of installations or of files, creation or modification of patch packages, or delaying or scheduling these activities based a contingency being met. For example, a patch may be created, but then its application on a target system 302 and/or its installation on target system 302 may either be canceled, delayed 317, or rescheduled upon a contingency being satisfied. The contingency could include and is not limited to the existence or non-existence of a file, a patch, an alteration to a file, a version of an application, or other factors within the target system 302 and/or RPM database 303.

Automatic processes to deploy individually, or mass-deploy patches, onto one or more repositories may also be undertaken based on what is maintained in the RPM database 303, with a prebuilt patch in a patch RPM being deployed and installed on one or more target systems 302. Once the patch RPMs are installed, then scripts may be executed that may optionally and automatically determine 316 by analyzing or checking for specific patches, packages, patch RPMs, RPMs, mapping files, or other metadata files stored in the RPM database 303 whether specific contingencies are met or satisfied, for example, whether certain required files or versions of a program are already installed, and upon determining the satisfaction of one or more contingencies, then applying the patch based on the mapping files may occur automatically. One exemplary aspect may include the presence of a security flaw, an automated check could be run against the RPM database to determine whether the security flaw has been updated, or a specific file still requires resolution, if a security patch requires the security flaw to exist, and even if it is an issue with an unreadable binary file, then the storage of the patch RPMs allows determination of any changes to binary or other files to be known and determined accurately. In various embodiments, the binary diff file is maintained either in the target system 302, or the RPM database 303, and in others it may be maintained in both. In various aspects it is the binary diff in the patch RPM that can be utilized to determine changes to be made to files in the target system 302, while revisiting or reanalyzing the binary diff may also allow for the determination of the historical changes that have been made to the target system 302.

The targeting of specific files based on information contained in the diff file, the patch RPM, or associated metadata also allows patches to not only be able to execute upon contingencies being satisfied, but also allows for the delaying of patching (or delay of certain portions of a patch being applied) or partial patching based on contingencies, as well as the inclusion or addition of parameters on files or a subset of files of the patch based on certain contingencies. This allows patches to be customized to exclude parameters, files, or subset of files on the target system 302 or the application to be patched, or to even target files within the patch itself, for example only deploy or apply certain files from the patch based on specific contingencies or based on the state of target system 302 or database 303, i.e., very specific contingencies and advanced patching parameters may be built into the patch RPM. This file-level highly customizable and prescriptive ability to patch applications and systems, as well as the lightweight and resource-light nature of patches able to be deployed as Patch RPMs means that patches may be continuously deployed to ensure that applications and target systems 302 are continuously maintained at desired states at all times.

FIG. 4 presents an example computer apparatus or subsystems that may be used to perform the methods and functions described herein. The example computer apparatus 1000 also referred to herein as subsystems 1000 are interconnected via a system bus 1010. Additional subsystems such as a printer 1018, keyboard 1026, fixed disk 1028 (or other memory comprising computer readable media), monitor 1022, which is coupled to display adapter 1020, and others are shown. Peripherals and input/output (I/O) devices, which couple to I/O controller 1012 (which can be a processor or other suitable controller), can be connected to the computer system by any number of means known in the art, such as serial port 1024. For example, serial port 1024 or external interface 1030 can be used to connect the computer apparatus to a wide area network such as the Internet, a mouse input device, or a scanner. The interconnection via system bus 1010 allows the central processor 1016 to communicate with each subsystem and to control the execution of instructions from system memory 1014 or the fixed disk 1028, as well as the exchange of information between subsystems. The system memory 1014 and/or the fixed disk 1028 may embody a computer readable medium.

FIG. 5 is a diagrammatic representation of an example system 1, with a host machine or computing device 2000, within which a set of instructions for causing the machine to perform any one or more of the methodologies discussed herein may be executed. In various example embodiments, the machine operates as a standalone device or may be connected (e.g., networked) to other machines. In a networked deployment, the host machine 2000 may operate in the capacity of a server or a client machine in a server-client network environment, or as a peer machine in a peer-to-peer (or distributed) network environment. The host machine 2000 may be a computer or computing device, a personal computer (PC), a tablet PC, a set-top box (STB), a personal digital assistant (PDA), a cellular telephone, a portable music player (e.g., a portable hard drive audio device such as an Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example system 1 includes the host machine 2000, running a host operating system (OS) 2001 on a processor or multiple processor(s)/processor core(s) 2003 (e.g., a central processing unit (CPU), a graphics processing unit (GPU), or both), and various memory nodes 2005. Host OS 2001 may include a hypervisor 2004 which is able to control the functions and/or communicate with a virtual machine ("VM") 2010 running on machine readable media. VM 2010 may also include a virtual CPU or vCPU 2009. Memory nodes 2005, and 2007 may be linked or pinned to virtual memory nodes or vNodes 2006 respectively. When a memory node 2005 is linked or pinned to a corresponding virtual node 2006, then data may be mapped directly from the memory nodes 2005 to their corresponding vNodes 2006.

All the various components shown in host machine 2000 may be connected with and to each other, or communicate to each other via a bus (not shown) or via other coupling or communication channels or mechanisms. The host machine 2000 may further include a video display, audio device or other peripherals 2020 (e.g., a liquid crystal display (LCD), alpha-numeric input device(s) including, e.g., a keyboard, a cursor control device, e.g., a mouse, a voice recognition or biometric verification unit, an external drive, a signal generation device, e.g., a speaker,) a persistent storage device 2002 (also referred to as disk drive unit), and a network interface device 2025. The host machine 2000 may further include a data encryption module (not shown) to encrypt data.

The components provided in the host machine 2000 are those typically found in computer systems that may be suitable for use with embodiments of the present disclosure and are intended to represent a broad category of such computer components that are known in the art. Thus, the system 1 can be a server, minicomputer, mainframe computer, or any other computer system. The computer may also include different bus configurations, networked platforms, multi-processor platforms, and the like. Various operating systems may be used including UNIX, LINUX, WINDOWS, QNX ANDROID, IOS, CHROME, TIZEN, and other suitable operating systems.

The disk drive unit 2002 may also be a Solid-state Drive (SSD), a hard disk drive (HDD) or other includes a computer or machine-readable medium on which is stored one or more sets of instructions and data structures (e.g., data or instructions 2015) embodying or utilizing any one or more of the methodologies or functions described herein. The instructions 2015 may also reside, completely or at least partially, within the main memory node 2005 and/or within the processor(s) 2003 during execution thereof by the host machine 2000. The processor(s) 2003, and memory nodes 2005 may also comprise machine-readable media.

The instructions 2015 may further be transmitted or received over a network 2030 via the network interface device 2025 utilizing any one of several well-known transfer protocols (e.g., Hyper Text Transfer Protocol (HTTP)). The term "computer-readable medium" or "machine-readable medium" should be taken to include a single medium or multiple medium (e.g., a centralized or distributed database and/or associated caches and servers) that store the one or more sets of instructions. The term "computer-readable medium" shall also be taken to include any medium that is capable of storing, encoding, or carrying a set of instructions for execution by the machine 2000 and that causes the machine 2000 to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read only memory (ROM), and the like. The example embodiments described herein may be implemented in an operating environment comprising software installed on a computer, in hardware, or in a combination of software and hardware.

One skilled in the art will recognize that Internet service may be configured to provide Internet access to one or more computing devices that are coupled to the Internet service, and that the computing devices may include one or more processors, buses, memory devices, display devices, input/output devices, and the like. Furthermore, those skilled in the art may appreciate that the Internet service may be coupled to one or more databases, repositories, servers, and the like, which may be utilized to implement any of the embodiments of the disclosure as described herein.

The computer program instructions may also be loaded onto a computer, a server, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Suitable networks may include or interface with any one or more of, for instance, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, Digital Data Service (DDS) connection, DSL (Digital Subscriber Line) connection, an Ethernet connection, an ISDN (Integrated Services Digital Network) line, a dial-up port such as a V.90, V.34 or V.34bis analog modem connection, a cable modem, an ATM (Asynchronous Transfer Mode) connection, or an FDDI (Fiber Distributed Data Interface) or CDDI (Copper Distributed Data Interface) connection. Furthermore, communications may also include links to any of a variety of wireless networks, including WAP (Wireless Application Protocol), GPRS (General Packet Radio Service), GSM (Global System for Mobile Communication), CDMA (Code Division Multiple Access) or TDMA (Time Division Multiple Access), cellular phone networks, GPS (Global Positioning System), CDPD (cellular digital packet data), RIM (Research in Motion, Limited) duplex paging network, Bluetooth radio, or an IEEE 802.11-based radio frequency network. The network 3030 can further include or interface with any one or more of an RS-232 serial connection, an IEEE-1394 (Firewire) connection, a Fiber Channel connection, an IrDA (infrared) port, a SCSI (Small Computer Systems Interface) connection, a USB (Universal Serial Bus) connection or other wired or wireless, digital or analog interface or connection, mesh or Digi® networking.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners or such systems may be accessible to outside users who deploy applications within the computing infrastructure to obtain the benefit of large computational or storage resources.

The cloud is formed, for example, by a network of web servers that comprise a plurality of computing devices, such as the host machine 2000, with each server 2035 (or at least a plurality thereof) providing processor and/or storage resources. These servers manage workloads provided by multiple users (e.g., cloud resource customers or other users). Typically, each user places workload demands upon the cloud that vary in real-time, sometimes dramatically. The nature and extent of these variations typically depends on the type of business associated with the user.

It is noteworthy that any hardware platform suitable for performing the processing described herein is suitable for use with the technology. The terms "computer-readable storage medium" and "computer-readable storage media" as used herein refer to any medium or media that participate in providing instructions to a CPU for execution. Such media can take many forms, including, but not limited to, non-volatile media, volatile media, and transmission media. Non-volatile media include, for example, optical or magnetic disks, such as a fixed disk. Volatile media include dynamic memory, such as system RAM. Transmission media include coaxial cables, copper wire and fiber optics, among others, including the wires that comprise one embodiment of a bus. Transmission media can also take the form of acoustic or light waves, such as those generated during radio frequency (RF) and infrared (IR) data communications. Common forms of computer-readable media include, for example, a flexible disk, a hard disk, magnetic tape, any other magnetic medium, a CD-ROM disk, digital video disk (DVD), any other optical medium, any other physical medium with patterns of marks or holes, a RAM, a PROM, an EPROM, an EEPROM, a FLASHEPROM, any other memory chip or data exchange adapter, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

Computer program code for carrying out operations for aspects of the present technology may be written in any combination of one or more programming languages, including an object oriented programming language such as Java, Smalltalk, C++, or the like and conventional procedural programming languages, such as the "C" programming language, Go, Python, or other programming languages, including assembly languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Some descriptions of terms used herein are provided below.

An "application" may include any software module configured to perform a specific function or functions when executed by a processor of a computer. Applications may be configured to perform many different functions. An "application" may be computer code or other data stored on a computer readable medium (e.g. memory element or secure element) that may be executable by a processor to complete a task.

As used herein, the term "computing device" or "computer device" may refer to one or more electronic devices that are configured to directly or indirectly communicate with or over one or more networks. A computing device may be a mobile device, a desktop computer, and/or the like. As an example, a mobile device may include a cellular phone (e.g., a smartphone or standard cellular phone), a portable computer, a wearable device (e.g., watches, glasses, lenses, clothing, and/or the like), a personal digital assistant (PDA), and/or other like devices. The computing device may be a mobile device or a non-mobile device, such as a desktop computer. Furthermore, the term "computer" may refer to any computing device that includes the necessary components to send, receive, process, and/or output data, and normally includes a display device, a processor, a memory, an input device, a network interface, and/or the like.

As used herein, the term "server" may include one or more computing devices which can be individual, stand-alone machines located at the same or different locations, may be owned or operated by the same or different entities, and may further be one or more clusters of distributed computers or "virtual" machines housed within a datacenter. It should be understood and appreciated by a person of skill in the art that functions performed by one "server" can be spread across multiple disparate computing devices for various reasons. As used herein, a "server" is intended to refer to all such scenarios and should not be construed or limited to one specific configuration. The term "server" may also refer to or include one or more processors or computers, storage devices, or similar computer arrangements that are operated by or facilitate communication and processing for multiple parties in a network environment, such as the Internet, although it will be appreciated that communication may be facilitated over one or more public or private network environments and that various other arrangements are possible. Reference to "a server" or "a processor," as used herein, may refer to a previously-recited server and/or processor that is recited as performing a previous step or function, a different server and/or processor, and/or a combination of servers and/or processors.

As used herein, the term "system" may refer to one or more computing devices or combinations of computing devices (e.g., processors, servers, client devices, software applications, components of such, and/or the like).

The foregoing detailed description includes references to the accompanying drawings, which form a part of the detailed description. The drawings show illustrations in accordance with exemplary embodiments. These example embodiments, which are also referred to herein as "examples," are described in enough detail to enable those skilled in the art to practice the present subject matter.

The various embodiments described above, are presented as examples only, and not as a limitation. The descriptions are not intended to limit the scope of the present technology to the forms set forth herein. To the contrary, the present descriptions are intended to cover such alternatives, modifications, and equivalents as may be included within the spirit and scope of the present technology as appreciated by one of ordinary skill in the art. Thus, the breadth and scope of a preferred embodiment should not be limited by any of the above-described exemplary embodiments.

While specific embodiments of, and examples for, the system are described above for illustrative purposes, various equivalent modifications are possible within the scope of the system, as those skilled in the relevant art will recognize. For example, while processes or steps are presented in a given order, alternative embodiments may perform routines having steps in a different order, and some processes or steps may be deleted, moved, added, subdivided, combined, and/or modified to provide alternative or sub-combinations. Each of these processes or steps may be implemented in a variety of different ways. Also, while processes or steps are at times shown as being performed in series, these processes or steps may instead be performed in parallel or may be performed at different times.

The embodiments can be combined, other embodiments can be utilized, or structural, logical, and electrical changes can be made without departing from the scope of what is claimed. It will be further understood by those within the art that typically a disjunctive word, and/or phrase presenting two or more alternative terms, whether in the description, claims, or drawings, should be understood to contemplate the possibilities of including one of the terms, either of the terms, or both terms unless context dictates otherwise. The detailed description is, therefore, not to be taken in a limiting sense, and the scope is defined by the appended claims and their equivalents. In this document, the terms "a" or "an" are used, as is common in patent documents, to include one or more than one. In this document, the term "or" is used to refer to a nonexclusive "or," such that "A or B" includes "A but not B," "B but not A," and "A and B," unless otherwise indicated.

All patents, patent applications, publications, or other disclosure material mentioned herein, are hereby incorporated by reference in their entirety as if each individual reference was expressly incorporated by reference respectively. All references, and any material, or portion thereof, that are said to be incorporated by reference herein are incorporated herein only to the extent that the incorporated material does not conflict with existing definitions, statements, or other disclosure material set forth in this disclosure. As such, and to the extent necessary, the disclosure as set forth herein supersedes any conflicting material incorporated herein by reference, and the disclosure expressly set forth in the present application controls.

Those skilled in the art will recognize that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one", and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one", and indefinite articles such as "a" or "an" (e.g., "a", and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A, and B together, A, and C together, B, and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A, and B together, A, and C together, B, and C together, and/or A, B, and C together, etc.).

With respect to the appended claims, those skilled in the art will appreciate that recited operations therein may generally be performed in any order. Also, although claim recitations are presented in a sequence(s), it should be understood that the various operations may be performed in other orders than those which are described, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

It is worthy to note that any reference to "one aspect," "an aspect,", an embodiment", "one embodiment", "an exemplification," "one exemplification,", and the like means that a particular feature, structure, or characteristic described in connection with the aspect is included in at least one aspect. Thus, appearances of the phrases "in one aspect," "in an aspect," "in an exemplification,", and "in one exemplification" in various places throughout the specification are not necessarily all referring to the same aspect. Furthermore, the particular features, structures or characteristics may be combined in any suitable manner in one or more aspects.

As used herein, the singular form of "a", "an", and "the" include the plural references unless the context clearly dictates otherwise.

Directional phrases used herein, such as, for example, and without limitation, top, bottom, left, right, lower, upper, front, back, and variations thereof, shall relate to the orientation of the elements shown in the accompanying drawing, and are not limiting upon the claims unless otherwise expressly stated.

The terms "about" or "approximately" as used in the present disclosure, unless otherwise specified, means an acceptable error for a particular value as determined by one of ordinary skill in the art, which depends in part on how the value is measured or determined. In certain aspects, the term "about" or "approximately" means within 1, 2, 3, or 4 standard deviations. In certain aspects, the term "about" or "approximately" means within 50%, 200%, 105%, 100%, 9%, 8%, 7%, 6%, 5%, 4%, 3%, 2%, 1%, 0.5%, or 0.05% of a given value or range.

In this specification, unless otherwise indicated, all numerical parameters are to be understood as being prefaced, and modified in all instances by the term "about," in which the numerical parameters possess the inherent variability characteristic of the underlying measurement techniques used to determine the numerical value of the parameter. At the very least, and not as an attempt to limit the application of the doctrine of equivalents to the scope of the claims, each numerical parameter described herein should at least be construed in light of the number of reported significant digits, and by applying ordinary rounding techniques.

Any numerical range recited herein includes all subranges subsumed within the recited range. For example, a range of "1 to 100" includes all sub-ranges between (and including) the recited minimum value of 1, and the recited maximum value of 100, that is, having a minimum value equal to or greater than 1, and a maximum value equal to or less than 100. Also, all ranges recited herein are inclusive of the end points of the recited ranges. For example, a range of "1 to 100" includes the end points 1, and 100. Any maximum numerical limitation recited in this specification is intended to include all lower numerical limitations subsumed therein, and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited. All such ranges are inherently described in this specification.

The terms "comprise" (and any form of comprise, such as "comprises", and "comprising"), "have" (and any form of have, such as "has", and "having"), "include" (and any form of include, such as "includes", and "including"), and "contain" (and any form of contain, such as "contains", and "containing") are open-ended linking verbs. As a result, a system that "comprises," "has," "includes" or "contains" one or more elements possesses those one or more elements, but is not limited to possessing only those one or more elements. Likewise, an element of a system, device, or apparatus that "comprises," "has," "includes" or "contains" one or more features possesses those one or more features, but is not limited to possessing only those one or more features.

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the invention in the form disclosed. Many modifications and variations will be apparent to those of ordinary skill in the art without departing from the scope and spirit of the invention. Exemplary embodiments were chosen and described to best explain the principles of the present technology and its practical application, and to enable others of ordinary skill in the art to understand the invention for various embodiments with various modifications as are suited to the particular use contemplated.

What is claimed is:

1. A method for targeted patching comprising:
running a diff tool on a software distribution package to determine differences between files in the software distribution package and an application to be patched, wherein the application is installed on a target system;
generating, based on the determined differences, a patch to be installed on the target system;
generating a mapping file, the mapping file including information on an installation location of the patch on the target system;
combining the mapping file and the patch into a patch package, the patch package comprising one or more contingencies that limit an installation of at least a portion of the patch package on the target system when the one or more contingencies are satisfied, wherein at least one contingency corresponds to an absence of a file in the target system;
determining that the one or more contingencies are satisfied based on accessing one or more files stored in a package management database to verify one or more historical changes applied to the target system;
subsequent to combining the mapping file and the patch into the patch package, installing a portion of the patch package on the target system to limit installation of the patch package based on the one or more contingencies related to the target system being satisfied, the patch package comprising a script configured to use the mapping file of the patch package to automatically apply a portion of the patch to the installation location on the target system; and
subsequent to installing the patch package on the target system, executing the script of the patch package to apply the portion of the patch package to modify a subset of files on the target system.

2. The method of claim 1, further comprising:
building the software distribution package, wherein the software distribution package comprises at least one of binary files, configuration files, documentation files, source code, and metadata.

3. The method of claim 1, further comprising:
applying a respective file of the patch into a respective mapped location on the target system based on the mapping file, wherein the mapping file is generated using metadata of at least one of the software distribution package and a diff file indicating the determined differences.

4. The method of claim 1, wherein the running of the diff tool generates a diff file.

5. The method of claim 4, further comprising:
maintaining the diff file on any one of the target system, or the package management database.

6. The method of claim 1, further comprising:
detecting the one or more contingencies for installing the patch, wherein metadata of the software distribution package comprises information describing the one or more contingencies; and
determining automatically that the one or more contingencies are satisfied to limit the installation of the patch package on the target system.

7. The method of claim 1, wherein the one or more contingencies comprise at least one of: a time of installation, an application size, a specified patch being installed, a specified software run on the target system, hardware, or operating system of the target system.

8. The method of claim 1, further comprising storing the patch package in the package management database, wherein the package management database enables one or more modifications applied to a set of files associated with the application using the patch to be traceable at a file level by indicating, based on the stored patch package in the package management database, one or more components of the application that have been updated.

9. The method of claim 1, wherein the patch makes changes to only a portion of the application based on the one or more contingencies being satisfied.

10. The method of claim 1, wherein the patch package contains metadata, the metadata comprising at least one of a name, a version, a change log, users, groups, requirements, or dependencies of the patch package or of the application.

11. The method of claim 1, further comprising:
delaying application of the patch on the target system based on a particular contingency of the one or more contingencies being satisfied.

12. The method of claim 1, wherein the software distribution package is an RPM package.

13. A system comprising:
a processor; and
a computer readable medium storing instructions executable by the processor to:
run a diff tool on a software distribution package to determine differences between files in the software distribution package and an application to be patched, wherein the application is installed on a target system;
generate, based on the determined differences, a patch to be installed on the target system;
generate a mapping file, the mapping file including information on an installation location of the patch on the target system;
combine the mapping file and the patch into a patch package, the patch package comprising one or more contingencies that are configured to limit an installation of at least a portion of the patch package on the target system when the one or more contingencies are satisfied, wherein at least one contingency corresponds to an absence of a file in the target system;
determine that the one or more contingencies are satisfied based on accessing one or more files stored in a package management database to verify one or more historical changes applied to the target system;
subsequent to combining the mapping file and the patch into the patch package, install a portion of the patch package on the target system to limit installation of the patch package based on the one or more contingencies related to the target system being satisfied, the patch package comprising a script that uses the mapping file of the patch package to automatically apply a portion the patch to the installation location on the target system; and
subsequent to installing the patch package on the target system, execute the script of the patch package to apply the portion of the patch package to modify a subset of files on the target system.

14. The system of claim 13, wherein the instructions executable by the processor further comprise:

build the software distribution package, wherein the software distribution package comprises at least one of binary files, configuration files, documentation files, source code, and metadata.

15. The system of claim 13, wherein the instructions executable by the processor further comprise:

apply a respective file of the patch into a respective mapped location on the target system based on the mapping file, wherein the mapping file is generated using metadata of at least one of the software distribution package and a diff file indicating the determined differences.

16. The system of claim 13, wherein the instructions executable by the processor to run the diff tool generates a diff file.

17. The system of claim 13, wherein the instructions executable by the processor further comprise:

detect the one or more contingencies for installing the patch, wherein metadata of the software distribution package comprises information describing the one or more contingencies; and determine automatically that the one or more contingencies are satisfied to limit the installation of the patch package on the target system.

18. The system of claim 13, wherein the instructions executable by the processor further comprise:

store the patch package in the package management database, wherein the package management database enables one or more modifications applied to a set of files associated with the application using the patch to be traceable at a file level by indicating, based on the stored patch package in the package management database, one or more components of the application that have been updated.

19. The system of claim 13, wherein the software distribution package is an RPM package.

20. A non-transitory computer-readable storage medium having embodied thereon a program, the program being executable by a processor to perform a method for providing a sentiment for digital information comprising:

run a diff tool on a software distribution package to generate a diff file;

generate, based on the diff file, a patch to be installed on a target system;

generate a mapping file, the mapping file including information on an installation location of the patch on the target system;

combine the mapping file and the patch into a patch package, the patch package comprising one or more contingencies that are configured to limit an installation of at least a portion of the patch package on the target system when the one or more contingencies are satisfied, wherein at least one contingency corresponds to an absence of a file in the target system;

determine that the one or more contingencies are satisfied based on accessing one or more files stored in a package management database to verify one or more historical changes applied to the target system;

install the patch package on the target system based on the one or more contingencies related to the target system being satisfied, the patch package comprising a script configured to use the mapping file of the patch package to automatically apply the patch to the installation location on the target system; and subsequent to installing the patch package on the target system, execute the script of the patch package to apply the patch package to modify a subset of files on the target system.

* * * * *